United States Patent [19]

Krivec

[11] Patent Number: 5,498,095
[45] Date of Patent: Mar. 12, 1996

[54] PRESS FITTED FLEXURAL PIVOT JOINT

[75] Inventor: Bert Krivec, Waukesha, Wis.

[73] Assignee: Snap-on Incorporated, Kenosha, Wis.

[21] Appl. No.: 246,152

[22] Filed: May 19, 1994

[51] Int. Cl.$^6$ .............................. B25B 7/06; B26B 13/28
[52] U.S. Cl. .............................. 403/291; 30/261; 30/268; 81/416
[58] Field of Search ................... 403/24, 291; 30/261, 30/234, 268; 81/416; 267/154, 160

[56] References Cited

U.S. PATENT DOCUMENTS

| | | | |
|---|---|---|---|
| 907,464 | 12/1908 | Conway | 30/268 |
| 1,295,316 | 2/1919 | Hines | 267/160 X |
| 1,314,337 | 8/1919 | Kimmey | |
| 1,324,598 | 12/1919 | Koehler | 30/268 X |
| 1,890,332 | 12/1932 | Muller-Keuth | |
| 2,724,250 | 11/1955 | Schonstedt | |
| 2,793,028 | 5/1957 | Wheeler | |
| 2,819,892 | 1/1958 | Huff | |
| 2,931,092 | 4/1960 | Humphrey | |
| 3,054,608 | 9/1962 | Pava | |
| 3,073,584 | 1/1963 | Troeger | 403/291 X |
| 3,124,873 | 3/1964 | Troeger | |
| 3,246,890 | 4/1966 | Ormond | |
| 3,277,555 | 10/1966 | Kutash | |
| 3,296,832 | 1/1967 | Fawick | |
| 3,312,458 | 4/1967 | Bratt | |
| 3,360,255 | 12/1967 | Ormond | |
| 3,575,070 | 4/1971 | Nichols | 30/261 X |
| 3,807,029 | 4/1974 | Troeger | |
| 3,825,992 | 7/1974 | Troeger | |
| 3,921,478 | 11/1975 | Ygfors | 30/261 X |
| 3,994,483 | 11/1976 | Perucchi et al. | 267/160 |
| 4,191,032 | 3/1980 | August | |
| 4,405,184 | 9/1983 | Bahiman | |
| 4,637,596 | 1/1987 | Lewis | |
| 4,655,096 | 4/1987 | Westhaver et al. | |
| 4,802,784 | 2/1989 | Brooks | |
| 5,061,107 | 10/1991 | Brooks | |
| 5,335,418 | 8/1994 | Krivec | 30/266 |

*Primary Examiner*—Anthony Knight
*Attorney, Agent, or Firm*—Emrich & Dithmar

[57] ABSTRACT

A flexural pivot joint includes two pivoting members, which may be levers of a pivotal hand tool, and two substantially identical flexible blade elements, each substantially Z-shaped and having opposite ends respectively connected to the pivoting members. In particular, each blade end has an enlarged coupling portion adapted to be press-fitted in a groove which may be formed either directly in the lever member or in a bushing which is fixed to the lever member. Each bushing may be either a full cylinder or a split cylinder. In one embodiment the joint includes, in addition to the Z-shaped elements, two non-identical flexible elements, the four elements being equiangularly spaced. The grooves and coupling portions may be complementarily shaped, with each groove having a bead receivable in a recess in the coupling portion to inhibit relative rotation.

23 Claims, 2 Drawing Sheets

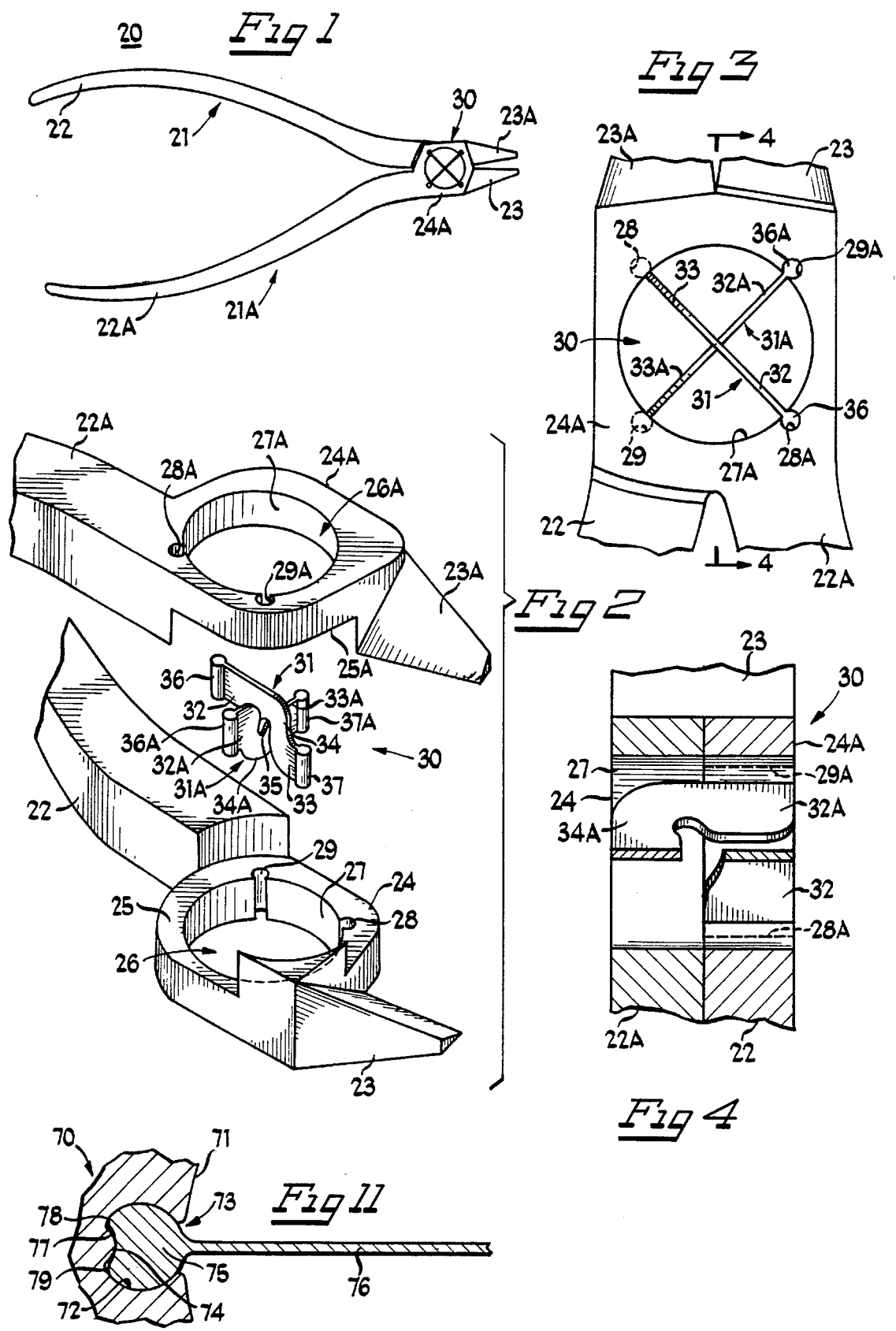

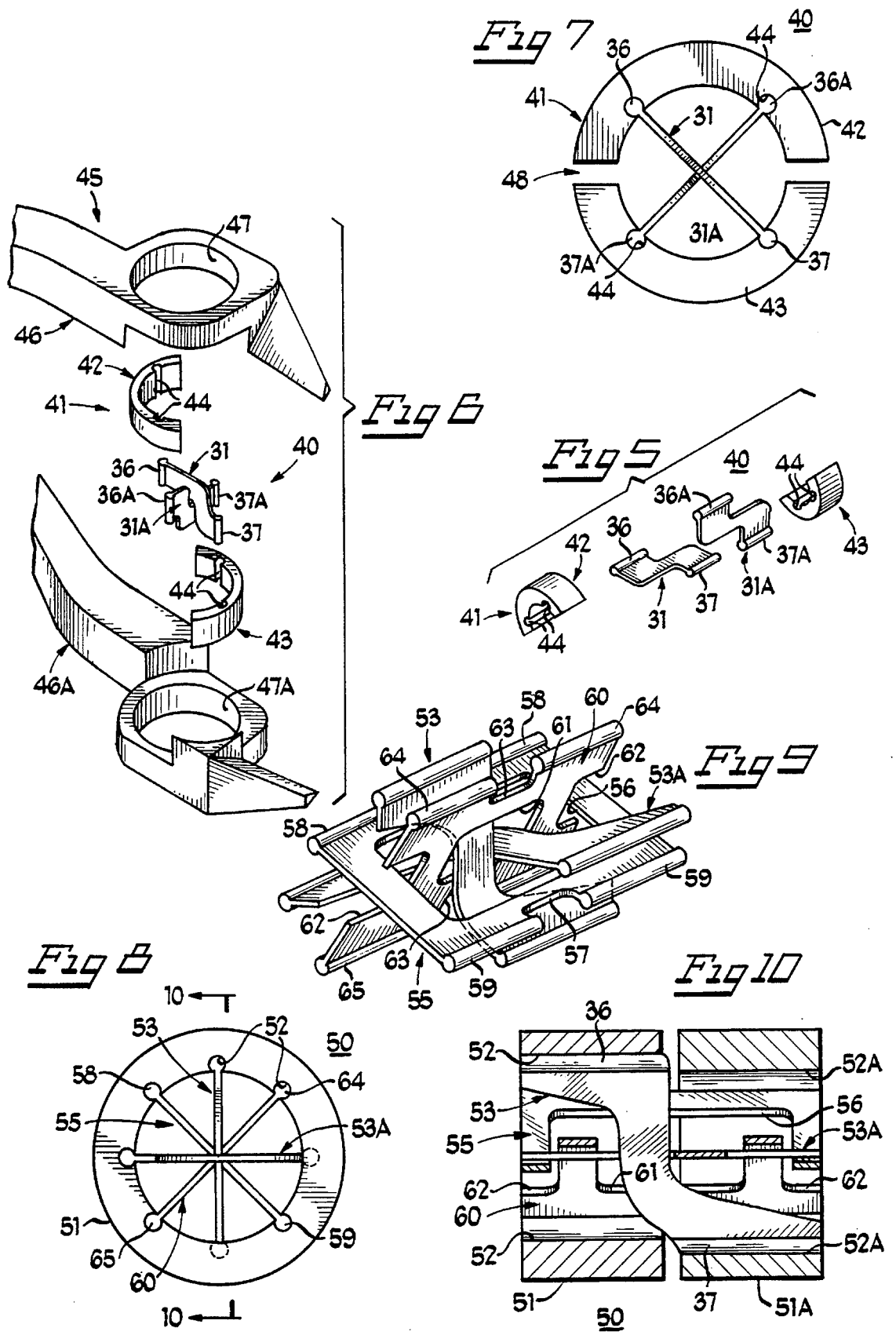

PRESS FITTED FLEXURAL PIVOT JOINT

BACKGROUND OF THE INVENTION

1. Field of the Invention

This invention relates to flexural joints for rotating or pivoting members and, more particularly, joints of the type which may be used in pivotal hand tools.

2. Description of the Prior Art

Flexural pivots are used to overcome a number of disadvantages associated with other types of pivot joints. Among the advantages of flexural pivots are the elimination of friction, backlash and wear, lack of requirement for lubrication, insensitivity to contamination and the ability to operate over a wide range of environmental conditions.

One prior type of flexural pivot is disclosed, for example, in U.S. Pat. No. 3,807,029. While that joint affords the above-mentioned advantages, it also has disadvantages. It involves the use of two bushings and two different flexible blade elements. This means that there are four distinct parts which must be fabricated, stocked and assembled to form the joint. Furthermore, the joint, when thus assembled, must in turn be assembled to the pivoting or rotating members of the particular application. Also, in the assembly of the pivot joint, the flexible blade elements must be brazed to the bushings, a costly and time-consuming procedure.

It is known to provide a flexural pivot joint which uses flexible blade elements of substantially identical construction, such an arrangement being disclosed, for example, in U.S. Pat. No. 5,061,107. However, this arrangement also requires the use of two bushings, and the blade ends must be secured by electron beam welding or epoxy adhesive to the bushings.

Another drawback of such prior flexural pivot joints is that they typically have a relatively low compression capacity and, therefore, if substantial axial forces are impressed on the joint, the flexible elements could be permanently deformed, thereby effectively destroying the joint.

SUMMARY OF THE INVENTION

It is a general object of the present invention to provide an improved flexural pivot joint which avoids the disadvantages of prior pivot joints while affording additional structural and operating advantages.

An important feature of the invention is a provision of a flexural pivot joint which is of simple and economical construction and is characterized by ease of assembly.

In connection with the foregoing feature, a further feature of the invention is the provision of a pivot joint of a type set forth, which minimizes the number of unique parts.

A further feature of the invention is the provision of a pivot joint of the type set forth, which includes flexible blade elements which can be connected directly to levers or other pivoting members of a particular application.

A still further feature of the invention is the provision of a pivot joint of the type set forth which has improved compression capacity.

Yet another feature of the invention is a provision of a pivot joint of the type set forth, wherein the joint can be assembled without the use of welding or adhesives.

Certain ones of these and other features of the invention are attained by providing a flexural pivot joint comprising first and second pivoting members pivotally movable relative to each other about a common pivot axis, a first generally Z-shaped flexible element defining a first plane which includes the axis, the first element having ends respectively connected to the first and second pivoting members, and a second generally Z-shaped flexible element spaced from the first element and defining a second plane which includes the axis, the second element having ends respectively connected to the first and second pivoting members.

Further features of the invention are attained by providing a flexural pivot joint comprising first and second elongated lever members each having a handle portion and a jaw portion and a neck portion interconnecting the handle portion and the jaw portion, each of the neck portions including a cylindrical surface portion, the lever members being crossed with the neck portions overlapping so that the cylindrical surface portions are coaxial with a common pivot axis, and first and second spaced-apart flexible elements respectively defining mutually perpendicular planes, each of the elements having opposite ends respectively directly connected to the cylindrical surface portions of the lever members.

Still further features of the invention are attained by providing a flexural pivot joint comprising first and second pivoting members respectively defining first and second cylindrical surface portions coaxial with a common pivot axis for relative pivotal movement about the axis, and four spaced-apart flexible elements respectively defining planes each including the axis, each of the flexible elements having opposed end portions respectively connected to the first and second pivoting members at opposite sides of the axis.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a top plan view of a pair of cutters utilizing a flexural pivot joint in accordance with one embodiment of the present invention;

FIG. 2 is an enlarged, fragmentary, perspective, exploded view of the pivot joint of the cutters of FIG. 1;

FIG. 3 is an enlarged, fragmentary top plan view of the joint portion of the cutters of FIG. 1, rotated 90° counter-clockwise;

FIG. 4 is a fragmentary view in vertical section taken along the line 4—4 in FIG. 3;

FIG. 5 is an exploded perspective view of another embodiment of the flexural pivot joint of the present invention;

FIG. 6 is a view similar to FIG. 2 of a cutter tool incorporating the flexural pivot joint of FIG. 5;

FIG. 7 is a an enlarged top plan view of the pivot joint of FIG. 5 in its assembled condition;

FIG. 8 is a top plan view of the pivot joint in accordance with another embodiment of the invention;

FIG. 9 is a perspective view of the flexible blades of the pivot joint of FIG. 8 with the bushing removed;

FIG. 10 is a view in vertical section taken along the line 10—10 in FIG. 8; and

FIG. 11 is an enlarged, fragmentary, sectional view of a preferred form of engagement of a flexible blade with a pivoting member in a pivot joint in accordance with the invention.

DESCRIPTION OF THE PREFERRED EMBODIMENTS

Referring to FIG. 1, there is illustrated a cutter tool, generally designated by the numeral 20, which incorporates a pivot joint 30 constructed in accordance with a first embodiment of the present invention. The cutter tool 20 is of standard pivoting-jaw construction, including a pair of lever members 21 and 21A which are similar in construction. Accordingly, the parts of each of the lever members 21 and 21A have been assigned the same reference numbers, with the reference numbers on the lever member 21A having the suffix "A" for ease of distinction. Referring now also to FIG. 2, the lever member 21 has a handle portion 22 at one end thereof, a jaw portion 23 at the opposite end thereof and a neck portion 24 interconnecting the handle and jaw portions 22 and 23. The neck portion 24 is thinner than the remainder of the lever member 21, having a recessed surface 25. Formed through the neck portion 24 is a cylindrical bore 26 defining a cylindrical surface 27 having two, axially extending grooves 28 and 29 formed therein at locations spaced apart by substantially 90°. The lever member 21A is similar to the lever member 21, having corresponding portions 22A—29A, the only difference being that the grooves 28A and 29A are, respectively, disposed at diametrically opposite locations from the grooves 28 and 29.

The pivot joint 30 is formed, in part, by the neck portions 24 and 24A of the lever members 21 and 21A and, in part, by two flexible blade elements 31 and 31A. The blade elements 31 and 31A are of identical construction, wherefore only one will be described in detail, and like parts of both are assigned the same reference numbers but, for purposes of distinguishing the two, the reference numbers of the blade element 31A have an "A" suffix. The flexible blade element 31 is in the form of a substantially flat, thin plate or blade which is substantially "Z"-shaped, having an end portion 32 projecting in one direction and an end portion 33 projecting in the opposite direction and a curved knee portion 34 interconnecting the end portions 32 and 33. An arcuate recess 35 is formed at the inner curve of the knee portion 34 to help minimize stress concentrations. Each of the end portions 32 and 33 is substantially rectangular in shape, these end portions respectively having formed at their distal edges elongated coupling ribs or beads 36 and 37, each extending the length of the associated distal edge and being thicker than the blade element 31 and dimensioned for mating engagement in the grooves 28, 29, 28A and 29A in the lever members 21 and 21A.

Referring also to FIGS. 3 and 4, in assembly the flexible blade elements 31 and 31A are first attached to the lever member 21. More specifically, the coupling rib 37 is press-fitted in the groove 28 and the coupling rib 37A is press-fitted in the groove 29, so that the flexible blade elements 31 and 31A respectively define substantially perpendicular planes, the blade elements 31 and 31A crossing at their knee portions 34 and 34A so as to provide clearance therebetween. It will be appreciated that, preferably, the ribs 37 and 37A have substantially the same length as the thickness of the neck portion 24 and each of the grooves 28 and 29 is shaped and dimensioned so that the ribs 37 and 37A cannot be remove( therefrom in a radial direction.

The lever member 21A is then crossed over the lever member 21 with the recessed surfaces 25 and 25A disposed in facing relationship and with the cylindrical bores 26 and 26A coaxially arranged. The coupling ribs 36 and 36A of the blade elements 31 and 31A are then, respectively, press-fitted in the grooves 28A and 29A of the lever member 21A, bringing the pivot joint 30 to the assembled condition illustrated in FIGS. 1, 3 and 4. Thus, there is provided a flexural pivot joint which utilizes only a single unique part (the flexible blade element 31), which must be assembled with the lever members of the cutter tool 20 to form the joint. Thus, only one part need be stocked in addition to the lever members 21 and 21A. Furthermore, the blade elements 31 and 31A can be assembled to the lever members 21 and 21A without the use of adhesives or attachment techniques, such as welding, brazing or the like, thereby greatly simplifying the assembly of the pivot joint 30.

In a preferred embodiment of the invention, the blade elements 31 and 31A are arranged, as illustrated in FIGS. 1 and 3, with their planes respectively disposed at substantially 45° angles to the longitudinal axis of the tool 20. Preferably, the parts are arranged so that, in the normal rest condition of the tool 20, the handle portions 22 and 22A and the jaw portions 23 and 23A are held apart by the spring factor of the pivot joint 30, being automatically returned to this initial position after performance of the cutting operation by a user.

Referring now also to FIGS. 5–7, there is illustrated a pivot joint generally designated by the numeral 40, constructed in accordance with another embodiment of the invention. The pivot joint 40 utilizes the same flexible blade elements 31 and 31A used in the pivot joint 30. However, in this case the blade elements 31 and 31A are connected to a split bushing 41 having two identical, substantially semi-cylindrical bushing halves 42 and 43. Each of the bushing halves 42 and 43 has formed on the inner part-cylindrical surface thereof two elongated grooves 44 extending axially thereof and circumferentially spaced apart by substantially 90°.

In assembly, the blade elements 31 and 31A are again crossed in the same manner as was described above in connection with the pivot joint 30, and the coupling ribs 36 and 36A are, respectively, press-fitted in the grooves 44 on the bushing half 42, while the coupling ribs 37 and 37A are, respectively, press-fitted in the grooves 44 on the bushing half 43, resulting in the assembled pivot joint 40 illustrated in FIG. 7. When thus assembled, it can be seen that there is a clearance gap 48 between the bushing halves 42 and 43 to accommodate limited relative pivotal movement thereof. There results a complete pivot joint 40 which can then be assembled, as a unit, in pivoting members of an associated application, such as a cutter tool 45 (FIG. 6).

The cutter tool 45 is substantially the same as the cutter tool 20, described above in connection with FIG. 1, being comprised of two lever members 46 and 46A having coaxial cylindrical bores 47 and 47A formed through the neck portions thereof. The lever members 46 and 46A are, respectively, substantially identical to the lever members 21 and 21A, described above, except that in this case the bores 47 and 47A do not have grooves formed therein. Thus, it will be appreciated that the lever members 46 and 46A may be identical in construction. In assembly, the lever members 46 and 46A are crossed in overlapping position in the same manner as was described above in connection with the cutter tool 20, and the split bushing halves 42 and 43 are, respectively, press-fitted into the cylindrical bores 47 and 47A.

It can be seen that there is again provided a pivot joint 40 which is of simple and economical construction and characterized by ease of assembly. In this case, the pivot joint itself includes two unique members, viz., the blade element 31 and the bushing half 42, but the lever members 46 and 46A are now identical, so that the total number of unique parts needed to assemble the cutter tool 45 is the same as the case of the cutter tool 20.

Referring now to FIGS. 8–10, there is illustrated a pivot joint 50 in accordance with another embodiment of the invention. The pivot joint 50 includes two cylindrical bushings 51 and 51A which are substantially identical in construction and have like numbers assigned to like parts, with the parts of the bushing 51A bearing the suffix "A". The bushing 51 has eight equiangularly spaced-apart grooves 52 formed in the inner surface thereof and extending axially the length thereof. The pivot joint 50 also includes four flexible blade elements, including substantially identical blade elements 53 and 53A, each of which is Z-shaped and is substantially similar to the blade elements 31 and 31A described above, except that the shape is slightly altered to afford adequate clearance for other parts of the pivot joint 50. Each of the blade elements 53 and 53A has the coupling ribs 36 and 37 (36A and 37A) respectively at the opposite ends thereof.

The pivot joint 50 also includes a flexible blade element 55, which is generally rectangular in shape, having a rectangular opening 56 therethrough centrally thereof, and having rectangular notches 57 formed respectively in the opposite long side edges thereof, intermediate the ends thereof. Formed along one of these long side edges, at opposite ends of the notch 57, are coupling ribs or beads 58, while like ribs or beads 59 are formed along the opposite long side edge. The pivot joint 50 also includes a flexible blade element 60, which is also substantially rectangular in shape and has a rectangular opening 61 formed therethrough centrally thereof. The blade element 60 has rectangular notches 62, respectively formed centrally of the opposite end edges thereof, and rectangular notches 63, respectively formed centrally of the opposite side edges thereof. Formed on one of these side edges are cylindrical coupling ribs or beads 64, while coupling ribs 65 are formed on the opposite side edge.

Referring in particular to FIGS. 9 and 10, the blade elements 53, 53A, 55 and 60 are arranged with the blade elements 53 and 53A crossed in substantially the same manner as was described above in connection with FIGS. 1–4 and extending through the central rectangular opening 61 of the blade element 60. The blade element 60, in turn, extends through the central rectangular opening 56 of the blade element 55. Then, the coupling ribs of the flexible blade elements are press-fitted in corresponding ones of the grooves 52, 52A of the bushings 51, 51A, so that the blade elements 53 and 53A respectively define perpendicular planes and the blade elements 55 and 60 respectively define perpendicular planes, the planes all being equiangularly spaced apart. In particular, the coupling ribs 36 and 36A and the coupling ribs 58, 59, 64 and 65 at one end of the blade elements 55 and 60 are all press-fitted in the grooves 52 of the bushing 51, while the coupling ribs 37 and 37A and the coupling ribs 58, 59, 64 and 65 at the opposite ends of the blade elements 55 and 60 are press-fitted in the grooves 52A of the bushing 51A.

The pivot joint 50, when thus assembled, can be similarly mounted in any desired pivotal application, such as a pivoting hand tool or the like, with the bushing 51 being press-fitted in a complementary bore in one of the pivoting members and the bushing 51A being press-fitted in a complementary bore in the other one of the pivoting members. It will be appreciated that, in the assembled pivot joint 50, the blade elements 53, 53A, 55 and 60 are all dimensioned so that they will be spaced from one another. However, because there are four blade elements, the pivot joint 50 has substantially increased spring factor and compression capacity.

In each of the pivot joints 30, 40 and 50, the ribs or beads 36, 37, 58, 59, 64 and 65 of the several flexible blade elements, and the grooves in which they are fitted, are all illustrated, for simplicity and convenience, as being part-cylindrical in transverse cross section, with the grooves having a circumferential extent greater than 180° so as to prevent removal of the ribs from the grooves in a radial direction. However, in the preferred embodiment, the ribs and corresponding grooves of each of the pivot joints 30, 40 and 50 will be constructed in accordance with the configuration illustrated in FIG. 11.

More specifically, in FIG. 11 there is illustrated a portion of a pivoting member 70, which may be representative of a lever member neck portion 24 or a pivot joint split bushing half 42 or 43 or a cylindrical bushing 51. The pivoting member 70 has a cylindrical inner surface 71 having formed therein a groove 72, which is generally part-cylindrical in shape and defines an entrance gap 73 thereinto which has a width substantially less than the maximum diameter of the groove 72. Formed at the bottom of the groove 72 diametrically opposite the entrance gap 73 is an arcuate, substantially part-cylindrical bead 74 which projects radially into the groove 72. There is received in the groove 72 a complementarily-shaped coupling rib 75 formed at the distal end of an associated flexible blade element 76, which may be any of the flexible blade elements 31, 55 or 60. The coupling rib 75 has a maximum diameter or thickness which is substantially greater than the thickness of the blade element 76 and, indeed, the width of the entrance gap 73 is substantially greater than the thickness of the blade element 76. The coupling rib 75 has formed in the distal end thereof, diametrically opposite the blade element 76, a part-cylindrical, arcuate recess 77 dimensioned for accommodating therein the bead 74 when the rib 75 is press-fitted in the groove 72. The recess 77 serves to define a pair of rounded projections 78 and 79 on the coupling rib 75. Preferably, the radius of the recess 77 is greater than that of the bead 74 so that there is a slight clearance space between the bead 74 and the projections 78 and 79.

In use, it will be appreciated that the projections 78 and 79 are, respectively, engageable with opposite sides of the bead 74 to prevent significant pivoting or rotational movement of the coupling rib 75 about its axis within the groove 72. The significant clearance splice between the opposite edges of the groove 72 at the entrance gap 73 and the blade element 76 accommodates a very slight rotational movement of the coupling rib 75, and also serves to accommodate flexural or pivotal movement of the blade element 76 relative to the coupling rib 75 about the junction therebetween.

While, in the illustrated embodiments, the pivot joint 40 has flexible blade elements coupled to bushing halves which are split along a diametral plane, it will be appreciated that, if desired, the flexible blade elements of the pivot joint 40 could be coupled to cylindrical, axially spaced-apart bushings of the general type used in the pivot joint 50. In like manner, the pivot joint 50 could, if desired, be constructed utilizing diametrically split, part-cylindrical bushing halves rather than axially spaced-apart cylindrical bushings. Also, in the illustrated embodiments, the pivot joints 30, 40, and 50 have been shown as applied to pivoting hand tools, it will be appreciated that they could be used in any number of other applications for joining pivoting members.

In constructional models of the invention, the flexible blade elements 31, 53, 55 and 60 are all formed of a suitable metal, such as a spring steel or the like, but it will be appreciated that any material having the requisite flexibility and strength could be utilized. While, in the preferred embodiments, these flexible blade elements are coupled to the associated pivoting members by press-fitting in associated grooves, they could be secured by other means. Similarly, the bushings 41 and 51 could be secured in the associated lever members or other pivoting members by means other than press fitting, if desired.

From the foregoing, it can be seen that there has been provided an improved flexural pivot joint which is of simple and economical construction, utilizing a minimal number of unique parts and characterized by ease of assembly and improved spring factor and compression capacity.

I claim:

1. A flexural pivot joint comprising: first and second pivoting members pivotally movable relative to each other about a common pivot axis, a first generally Z-shaped flexible element defining a first plane which includes said axis said first element having ends respectively connected to said first and second pivoting members, and a second generally Z-shaped flexible element spaced from said first element and defining a second plane which includes said axis, said second element having ends respectively connected to said first and second pivoting members.

2. The pivot joint of claim 1, wherein each of said flexible elements is in the form of a substantially flat blade.

3. The pivot joint of claim 2, wherein each of said flexible elements is formed of metal.

4. The pivot joint of claim 1, wherein each of said pivoting members has two grooves formed therein, each end of each of said flexible elements having an enlarged coupling portion adapted to be received in an associated one of said grooves.

5. The pivot joint of claim 1, wherein each of said pivoting members is in the form of an elongated lever member.

6. The pivot joint of claim 1, wherein each of said pivoting members is in the form of a bushing member.

7. The pivot joint of claim 6, wherein each of said bushing members is substantially cylindrical in shape.

8. The pivot joint of claim 6, wherein each of said bushing members is substantially semi-cylindrical in shape.

9. A flexural pivot joint comprising: first and second elongated lever members each having a handle portion and a jaw portion and a neck portion interconnecting said handle portion and said jaw portion, each of said neck portions including a cylindrical surface portion, said lever members being crossed with said neck portions overlapping so that said cylindrical surface portions are coaxial with a common pivot axis, and first and second spaced-apart flexible elements respectively defining mutually perpendicular planes, each of said elements having opposite ends respectively directly connected to said cylindrical surface portions of said lever members.

10. The pivot joint of claim 9, wherein each of said cylindrical surface portions defines a full cylinder.

11. The pivot joint of claim 9, wherein each of said cylindrical surface portions has grooves formed therein and extending axially thereof, each of said ends of each of said flexible elements having an enlarged coupling portion adapted to be received in an associated one of said grooves.

12. The pivot joint of claim 11, wherein each of said flexible elements is substantially Z-shaped.

13. The pivot joint of claim 11, wherein each of said coupling portions is press fitted into the associated groove.

14. The pivot joint of claim 9, wherein said lever members cooperate with said flexible elements to define a pivoting hand tool.

15. A flexural pivot joint comprising: first and second pivoting members respectively defining first and second cylindrical surface portions coaxial with a common pivot axis for relative pivotal movement about said axis, and four spaced-apart flexible elements respectively defining planes each including said axis, each of said flexible elements having opposed end portions respectively connected to said first and second pivoting members at opposite sides of said axis.

16. The pivot joint of claim 15, wherein two of said flexible elements are substantially identical in construction.

17. The pivot joint of claim 16, wherein said two flexible elements are substantially Z-shaped.

18. The pivot joint of claim 15, wherein each of said pivoting members has a plurality of grooves formed therein, each end of each of said flexible elements having an enlarged coupling portion adapted to be received in an associated one of said grooves.

19. The pivot joint of claim 15, wherein each of said pivoting members is in the form of a bushing.

20. The pivot joint of claim 15, wherein said planes are equiangularly spaced.

21. A flexural pivot joint comprising: first and second pivoting members pivotally movable relative to each other about a common pivot axis, a flexible blade element defining a plane which includes said axis and having ends respectively defining coupling portions, each of said coupling portions having a thickness substantially greater than that of said blade element and having a recess formed therein, first and second grooves respectively formed in said first and second pivoting members and each having a bead projecting thereinto, said coupling portions being respectively received in said grooves with said beads being respectively received in said recesses for inhibiting rotational movement of said coupling portions within said grooves.

22. The pivot joint of claim 21, wherein each of said grooves has a lateral entrance with a width substantially less than the thickness of the associated coupling portion and substantially greater than the thickness of said flexible blade element.

23. The pivot joint of claim 22, wherein in each of said grooves said bead is disposed opposite said entrance.

* * * * *